(12) United States Patent
Tsai

(10) Patent No.: US 8,080,946 B2
(45) Date of Patent: Dec. 20, 2011

(54) FLAT DISCHARGE LAMP AND PRODUCTION METHOD THEREOF

(75) Inventor: Chun-Hui Tsai, Hsin-chu (TW)

(73) Assignee: Applied Green Light Taiwan, Inc., Hsin-Chu (TW)

( * ) Notice: Subject to any disclaimer, the term of this patent is extended or adjusted under 35 U.S.C. 154(b) by 585 days.

(21) Appl. No.: 12/348,330

(22) Filed: Jan. 5, 2009

(65) Prior Publication Data

US 2009/0273294 A1 Nov. 5, 2009

(30) Foreign Application Priority Data

Apr. 30, 2008 (TW) ................................ 97115848 A

(51) Int. Cl.
*H05B 41/00* (2006.01)
(52) U.S. Cl. .......... 315/260; 315/261; 315/246; 313/607
(58) Field of Classification Search .................... 315/94, 315/105, 111.21, 111.31, 111.71, 169.1–169.4, 315/246, 252, 260, 261, 291, 307, 334, 339; 313/484, 491–495, 567, 581, 585, 607, 633, 313/634
See application file for complete search history.

(56) References Cited

U.S. PATENT DOCUMENTS

| | | | | |
|---|---|---|---|---|
| 5,965,988 A | * | 10/1999 | Vollkommer et al. | 315/246 |
| 5,994,849 A | * | 11/1999 | Vollkommer et al. | 315/246 |
| 7,193,363 B2 | * | 3/2007 | Kawashima | 313/509 |

\* cited by examiner

*Primary Examiner* — Jacob Y Choi
*Assistant Examiner* — Jimmy Vu
(74) *Attorney, Agent, or Firm* — Ming Chow; Sinorica, LLC

(57) ABSTRACT

The present invention provides a flat discharge lamp and the production method thereof. The flat discharge lamp comprises an upper substrate, a lower substrate and a discharge chamber disposed between the upper substrate and the lower substrate, wherein the discharge chamber is filled with an inert gas, and a plurality of first electrodes and second electrodes are arranged with one another disposed on the discharge chamber. Besides, each of the first electrodes and second electrodes is connected with one end and another end of an alternating power supply, respectively. The invention is characterized in that the discharge chamber is provided with fluorescent film coated on its interior surface and a plurality of third electrodes each disposed between the first electrode and the second electrode. Besides, all the third electrodes are connected to a common plane, or each of which is connected to the common plane, respectively. The third electrode is controllable to change the discharge energy and path when dielectrically impeded discharge is carried out between the first electrode and the second electrode.

20 Claims, 4 Drawing Sheets

FLAT DISCHARGE LAMP AND PRODUCTION METHOD THEREOF

BACKGROUND OF THE INVENTION

1. Technical Field

The present invention relates to a flat discharge lamp and a production method thereof, and particularly to flat discharge lamp wherein a third electrode is disposed between two distinct electrodes and a production method thereof.

2. Description of Related Art

Conventionally, general flat discharge lamps use incoherently emitting radiation sources for emitting different tones of light, to connect two dielectric electrode plates of a radiator to the two terminals of an AC (Alternate Current) voltage source, and cause the inert gas in the discharge chamber to generate discharge having plasma phenomenon due to the high voltage between the two electrode plates, resulting in the fluorescent medium in the discharge chamber tube being excited to achieve illumination effect. However, this type of discharge is prone to cause high temperature on the discharge chamber tube surface layer and therefore needs to use cooling tube to dissipate the heat. Also, the illumination efficiency of the radiator is affected because of high temperature.

In order to solve the aforementioned problem, U.S. Pat. No. 5,994,849 discloses an operating method of a flat discharge lamp having a structure as shown in FIG. 1A and FIG. 1B. The flat discharge lamp 10 has a flat shaped discharge chamber 11, wherein the discharge chamber 11 is filled with an inert gas 130, and on one surface of the discharge chamber 11 is disposed a plurality of collocated first electrodes 141 and second electrodes 142. The two terminals 161 and 162 of an AC voltage source 16 coupled to the first electrodes 141 and the second electrodes 142 cause a three-dimensional discharge inside the discharge chamber 11 via the voltage pulse sequence provided by the AC voltage source 16. In particular, the three-dimensional discharge is at a distance from the inner wall of the discharge chamber 11, so as to avoid direct discharge on the inner wall surface of the discharge chamber 11. Although the three-dimensional discharge provided by this prior art patent serves to reduce the problematic high temperature at the inner wall of the discharge chamber 11 by keeping a distance from the discharge chamber inner wall, the heat generated through discharge is still clustered in the discharge chamber and can not be effectively removed. Furthermore, during discharge, there exists no boundary between the two electrodes, causing the electric field between the two electrodes to weaken, thereby rendering the illumination intensity of the flat discharge lamp 10 unstable.

SUMMARY OF THE INVENTION

In order to resolve the shortcomings of the prior art, a flat discharge lamp and a production method thereof are disclosed in the present invention. The flat discharge lamp includes an upper substrate, a lower substrate and a discharge chamber located therebetween, wherein the discharge chamber is filled with a gas. A plurality of first electrodes and second electrodes are disposed in pairs with each other and arranged on the exterior of the discharge chamber, while the plurality of first electrodes and second electrodes are coupled to the two terminals of an AC voltage source respectively. The present invention is characterized by: the discharge chamber further having a fluorescent film; the discharge chamber being filled with an inert gas; and the flat discharge lamp further having a plurality of third electrodes arranged between the first electrodes and the second electrodes, the plurality of third electrodes being individually or simultaneously coupled to a common plane, wherein the first electrodes and the second electrodes change the discharge energy via the third electrodes when conducting dielectrically impeded discharge in the discharge chamber.

Therefore, the main objective of the present invention is to provide a flat discharge lamp, wherein by disposing third electrodes between two electrodes and coupling all of the third electrodes to a common plane, a surface temperature of the discharge chamber is effectively regulated, thereby achieving better heat dissipation results.

The secondary objective of the present invention is to provide a flat discharge lamp, wherein by disposing third electrodes between two electrodes and coupling all of the third electrodes to a common plane, an electric field interference between two said electrodes is effectively eliminated, thereby achieving more stable illumination intensity.

A further objective of the present invention is to provide a flat discharge lamp, wherein by disposing third electrodes between two electrodes and coupling all of the third electrodes to a common plane, a surface temperature of the discharge chamber is effectively regulated, thereby achieving better heat dissipation results.

Still another objective of the present invention is to provide a flat discharge lamp, wherein by disposing third electrodes between two electrodes and coupling all of the third electrodes to a common plane, an electric field interference between two said electrodes is effectively eliminated, thereby achieving more stable illumination intensity.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

A flat discharge lamp and a production method thereof are disclosed in the present invention, wherein the light source utilized and the theory behind plasma formation are understood by those skilled in the art, so a full description thereof is not presented in the description that follows. Also, what needs to be noted is that drawings referred to by the following description are for illustrating structure schematic related to the characteristics of the present invention and therefore are not drawn to scale.

Figure 1A:
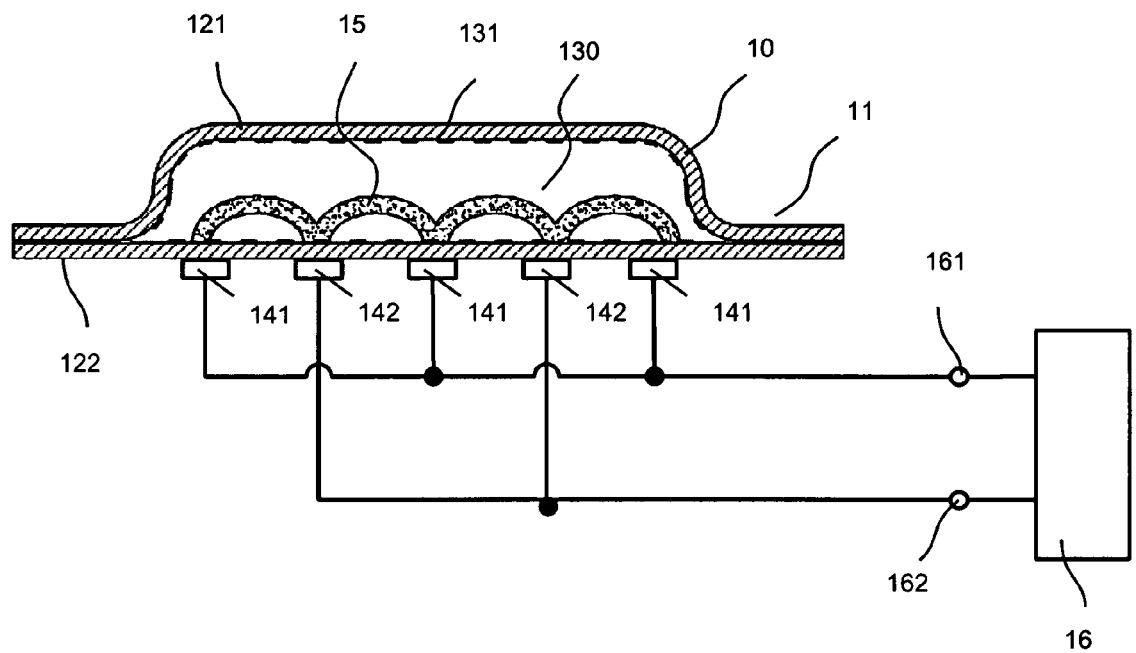
FIG. 1A is a cross-sectional schematic diagram of a conventional flat discharge lamp.
Figure 1B:
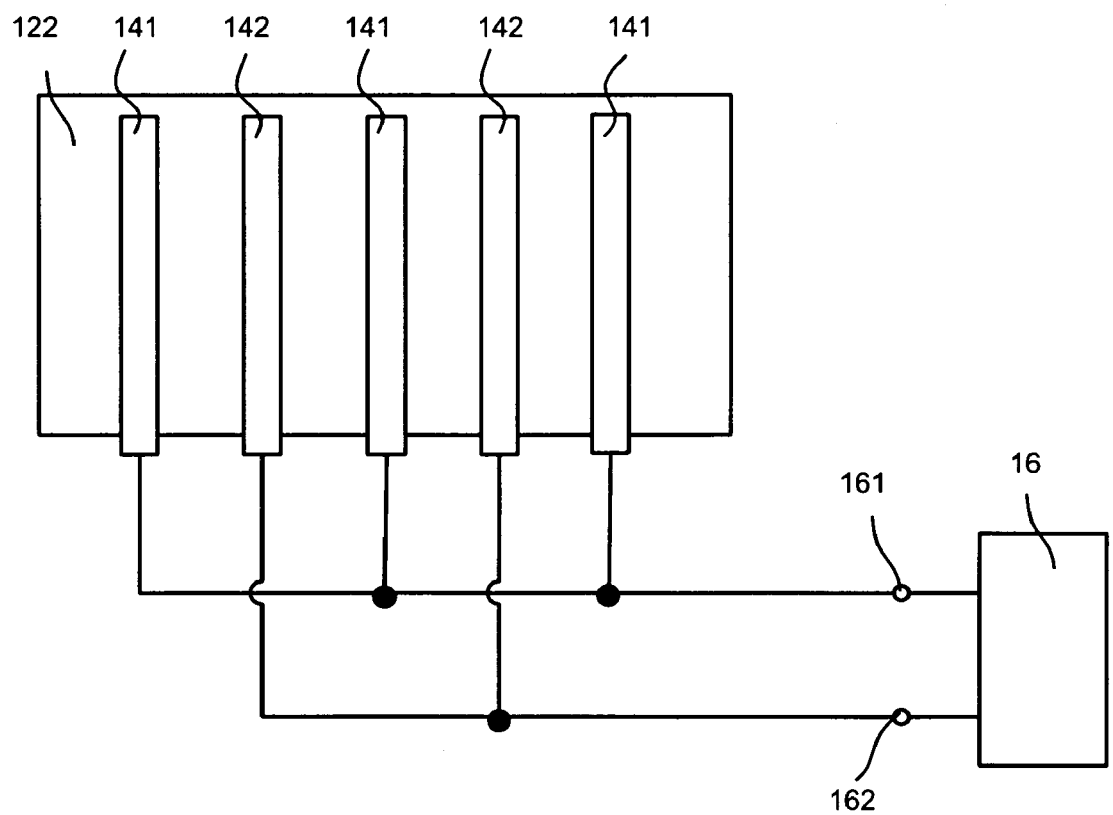
FIG. 1B is a top view of the flat discharge lamp of FIG. 1A.
Figure 2A:
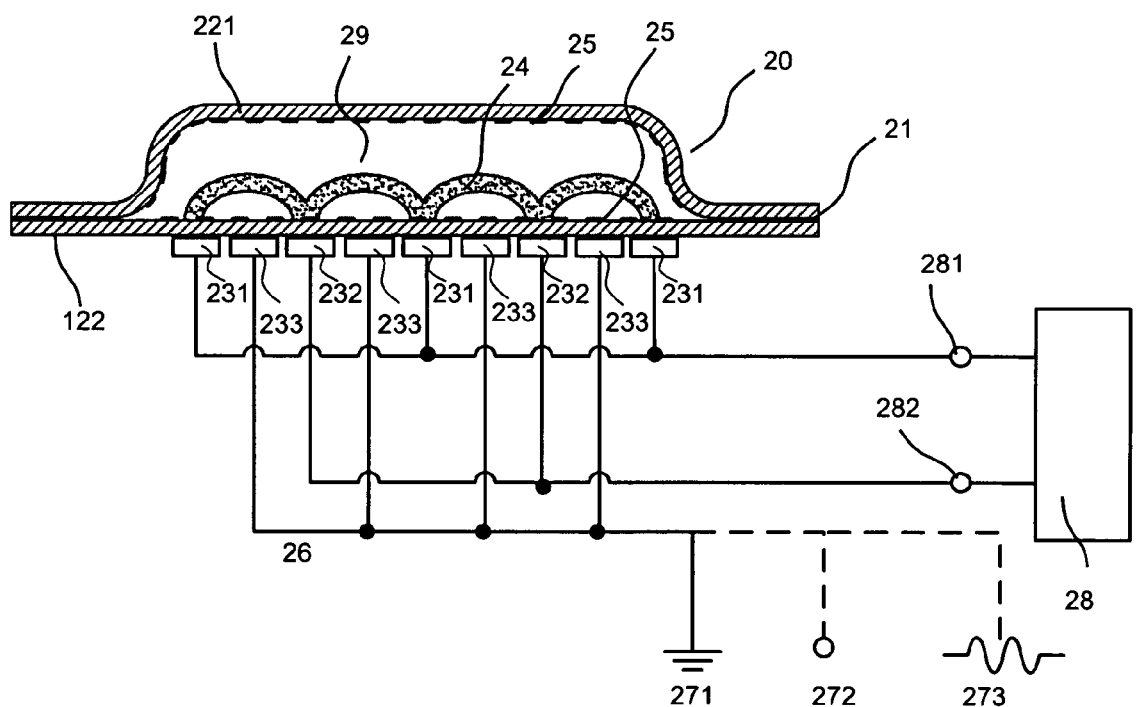
FIG. 2A is a cross-sectional schematic diagram of a flat discharge lamp of the present invention.
Figure 2B:
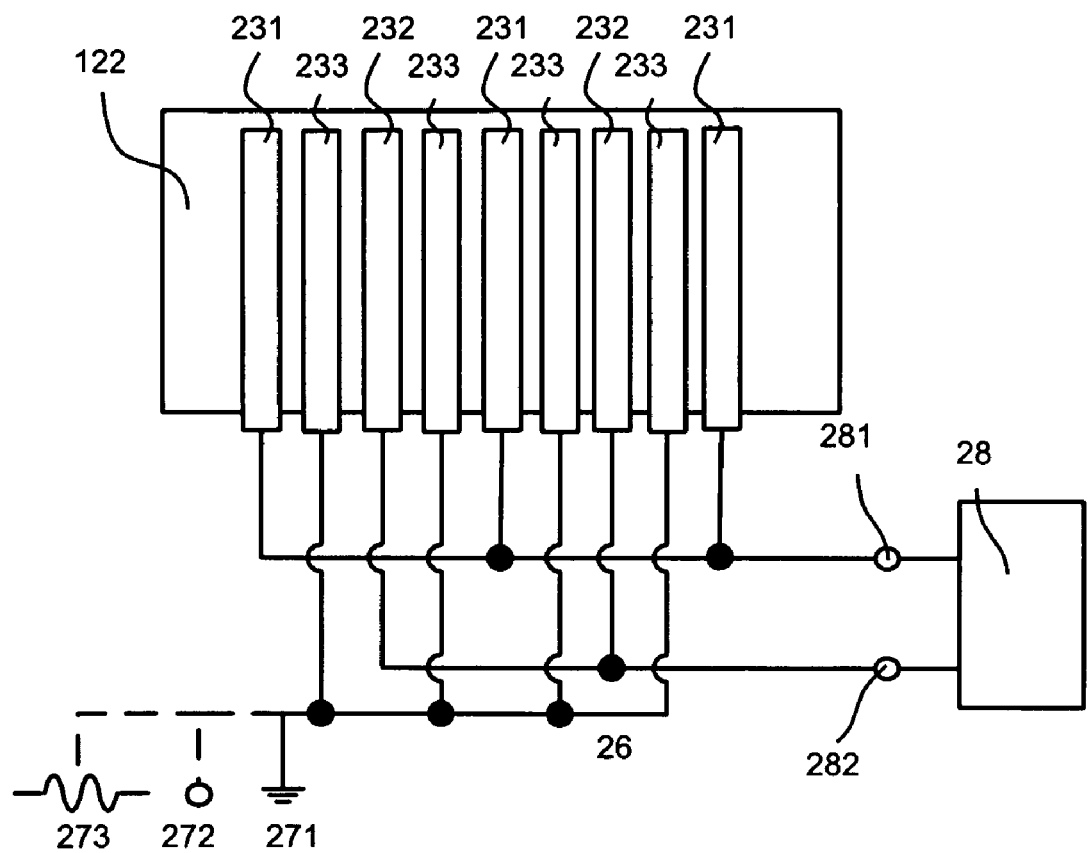
FIG. 2B is a top view of the flat discharge lamp of FIG. 2A.

Refer to FIGS. 2A and 2B for a flat discharge lamp 20 according to a first preferred embodiment of the present invention, wherein the flat discharge lamp 20 includes an upper substrate 221, a lower substrate 222, and a discharge chamber 21 disposed therebetween and the discharge chamber has a flat shape in appearance. The discharge chamber 21 is filled with an inert gas Xenon 29, and multiple first electrodes 231 and second electrodes 232 are disposed in pairs with each other on the lower substrate 222 and arranged on an exterior of the discharge chamber 21. Also, the multiple first electrodes 231 and second electrodes 232 are coupled to two terminals 281 and 282 of an AC voltage source 28 respectively, wherein the AC voltage source 28 has a high voltage pulse sequence. Furthermore, a fluorescent film 25 is dispensed on an inner wall of the discharge chamber 21, and multiple third electrodes 233 are disposed between the aforementioned first electrodes 231 and second electrodes 232, wherein the multiple third electrodes 233 are also coupled to a common plane 26 coupled to a ground node 271, a floating node 272 or a waveform input 273. When a high voltage discharge is conducted via a high voltage pulse sequence of the AC voltage source 28 between the first electrodes 231 and the second electrodes 232, due to a high voltage discharge between the electrodes 231 and 232, the inert gas 29 in the discharge chamber 21 is excited to produce ultraviolet light (UV) or vacuum ultraviolet light (VUV), thereby causing the fluorescent film 25 on the discharge chamber 21 inner wall to be excited by the ultraviolet light or vacuum ultraviolet light to achieve illumination. However, since the discharge chamber 21 is filled with the inert gas 29, the inert gas particles become ionized during the discharge process, such that dielectrically impeded discharge exhibiting plasma phenomenon is formed. At the same time, because of the neutral electric potential of the third electrodes 233 for forming a boundary between the first electrodes 231 and second electrodes 232, not only the ionized gas particles and part of the discharge electrons on the inner surface of the discharge chamber 21 near the two electrodes are eliminated by absorption via the third electrodes 233, but the high temperature phenomenon at the inner surface of the discharge chamber 21, formed owing to discharge, is also eliminated, thereby ensuring better stability of illumination intensity of the flat discharge lamp 10, as well as achieving the effect of temperature reduction or heat dissipation.

In the aforementioned embodiment, the first electrodes 231 and the second electrodes 232 are preferably disposed with an equal distance therebetween, while the third electrodes 233 are disposed at midpoints of the first electrodes 231 and second electrodes 232. Furthermore, the high voltage pulse sequence of the AC voltage source 28 is formed by multiple voltage pulses with a sinusoidal waveform, each voltage pulse having a pulse width of 0.1 µs to 10 µs, wherein the preferred pulse width is 0.5 µs to 5 µs. The aforementioned voltage pulse has a pulse frequency of 1 KHz to 1 MHz wherein the preferred pulse frequency is 10 KHz to 100 KHz, and a pulse amplitude of 100V to 10 KV.

In the foregoing embodiment, besides Xenon, the inert gas 29 can be selected from one of Helium, Neon, Argon, Krypton or Radon, or a combination thereof. Furthermore, the fluorescent film 25 dispensed on the inner wall of the discharge chamber serves to transform the ultraviolet light (UV) and vacuum ultraviolet light (VUV) into visible light. Further yet, the upper substrate 221 is made of glass, and the discharge chamber 21 is made of glass, while the lower substrate 222 is made of glass with better heat dissipative ability or ceramic. Also, the upper substrate 221 and the lower substrate 222 are coupled by a sealing process, and the first electrodes 231, the second electrodes 232 and the third electrodes 233 are either metal strips or metal wires. Moreover, each voltage pulse is separated by a time pause, and this time pause is between 5 µs and 100 µs.

A second preferred embodiment of the present invention is further disclosed, which is a production method of a flat discharge lamp, the production method including:

(1) providing an upper substrate, a lower substrate, and a discharge chamber located therebetween;

(2) filling an inert gas in the aforementioned discharge chamber, the inert gas being Xenon;

(3) disposing on the aforementioned lower substrate multiple first electrodes and second electrodes in pairs with each other, these first electrodes and second electrodes being arranged on the outer surface of the aforementioned discharge chamber;

(4) coupling all of the first and the second electrodes to two terminals of an AC voltage source, respectively;

(5) further disposing a fluorescent film on an inner wall of the aforementioned discharge chamber;

(6) further disposing third electrodes between the first and second electrodes, wherein the third electrodes may be coupled to a ground node, a floating node or an input; and (7) further coupling all of the third electrodes respectively or simultaneously to a common plane, wherein when the first and the second electrodes conduct dielectrically impeded discharge in the aforementioned discharge chamber, a discharge energy intensity is stabilized via a border between the first and the second electrodes formed by a neutral electric potential of the third electrodes, thereby reducing an exceedingly high surface temperature of the aforementioned discharge chamber.

In the production method above, the upper substrate, the lower substrate, the discharge chamber, the first electrodes, the second electrodes, the third electrodes and the common plane used have materials and structures as described in the foregoing first embodiment, and the discharge type in the discharge chamber, the pulse sequence used by the voltage source, the pulse waveform, the pulse frequency, the pulse amplitude, the pulse width and the time pause are as described in the first embodiment. Furthermore, the aforementioned flat discharge lamp is manufactured to occupy large area, achieving better overall temperature reduction result.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

The invention claimed is:

1. A flat discharge lamp comprising an upper substrate, a lower substrate and a discharge chamber located therebetween, wherein said discharge chamber is filled with a gas, and a plurality of first electrodes and second electrodes are disposed in pairs with each other and arranged on the exterior of said discharge chamber, in which said plurality of first electrodes and second electrodes are coupled to two terminals of an AC voltage source respectively, characterized by:

said discharge chamber further having a fluorescent film; said discharge chamber being filled with an inert gas; and said flat discharge lamp further having a plurality of third electrodes arranged between said first electrodes and said second electrodes, said plurality of third electrodes being individually or simultaneously coupled to a common plane for enabling dielectrically impeded discharge in stable fashion between said first electrodes and said second electrodes, wherein said first electrodes and said second electrodes change a discharge energy via said third electrodes when conducting said dielectrically impeded discharge in said discharge chamber.

2. The flat discharge lamp of claim 1, wherein said common plane is coupled to a ground node, a floating node or a wave input.

3. The flat discharge lamp of claim 1, wherein said plurality of first and second electrodes are arranged to have an equal distance.

4. The flat discharge lamp of claim 1, wherein said third electrodes are exactly located at midpoints between said first electrodes and said second electrodes.

5. The flat discharge lamp of claim 1, wherein said AC voltage source further provides a voltage pulse sequence having a plurality of voltage pulses.

6. The flat discharge lamp of claim 5, wherein said voltage pulse lies in a range between 0.1 μs and 10 μs.

7. The flat discharge lamp of claim 6, wherein said voltage pulse is in the range between 0.5 μs and 5 μs.

8. The flat discharge lamp of claim 5, wherein said voltage pulse lies in a range between 1 KHz and 1 MHz.

9. The flat discharge lamp of claim 8, wherein said voltage pulse wherein said voltage pulse is in the range between 10 KHz and 100 KHz.

10. The flat discharge lamp of claim 5, wherein said voltage pulse has a half-sinusoidal waveform.

11. The flat discharge lamp of claim 5, wherein said voltage pulse has a pulse amplitude of 100V to 10 KV.

12. The flat discharge lamp of claim 1, wherein said inert gas is selected from a group consisting of Helium, Neon, Argon, Krypton, Xenon or Radon, and a combination thereof.

13. The flat discharge lamp of claim 1, wherein the fluorescent film of said discharge chamber inner wall is used for transforming an ultraviolet light (UV) or a vacuum ultraviolet light (VUV) to a visible light.

14. The flat discharge lamp of claim 1, wherein said upper substrate is made of glass.

15. The flat discharge lamp of claim 1, wherein said discharge chamber is made of glass.

16. The flat discharge lamp of claim 1, wherein said lower substrate is made of glass or ceramic.

17. The flat discharge lamp of claim 1, wherein said upper substrate and said lower substrate are coupled by a sealing process.

18. The flat discharge lamp of claim 1, where said first electrodes, said second electrodes and said third electrodes are metal strips or metal wires, respectively.

19. The flat discharge lamp of claim 1, wherein each said voltage pulse is spaced by a time pause, and said time pause is between 5 μs and 100 μs.

20. A production method for producing a flat discharge lamp, comprising:
   providing an upper substrate, a lower substrate and a discharge chamber located between said upper substrate and said lower substrate;
   filling said discharge chamber with an inert gas;
   disposing a plurality of first electrodes and second electrodes in pairs with each other, said plurality of first and second electrodes being arranged on an exterior of said discharge chamber;
   coupling said plurality of first and second electrodes to two terminals of an AC voltage source respectively;
   dispensing a fluorescent film on an inner wall of said discharge chamber;
   disposing a plurality of third electrodes on said flat discharge lamp, wherein said third electrodes are arranged between said first electrodes and said second electrodes; and
   coupling said plurality of third electrodes to a common plane individually and simultaneously, wherein said first electrodes and said second electrodes change a discharge energy via said third electrodes when conducting a dielectrically impeded discharge.

* * * * *